United States Patent
Pehrson et al.

(10) Patent No.: US 8,954,214 B2
(45) Date of Patent: Feb. 10, 2015

(54) MOTOR ASSEMBLY

(71) Applicant: Volvo Car Corporation, Goeteborg (SE)

(72) Inventors: Hans Pehrson, Torslanda (SE); Sture Wingard, Lerum (SE)

(73) Assignee: Volvo Car Corporation (SE)

( * ) Notice: Subject to any disclaimer, the term of this patent is extended or adjusted under 35 U.S.C. 154(b) by 0 days.

(21) Appl. No.: 13/648,718

(22) Filed: Oct. 10, 2012

(65) Prior Publication Data

US 2013/0090796 A1 Apr. 11, 2013

(30) Foreign Application Priority Data

Oct. 21, 2011 (EP) ..................................... 11186098

(51) Int. Cl.
*B60L 15/20* (2006.01)
*G06F 17/00* (2006.01)
*B60L 11/18* (2006.01)

(52) U.S. Cl.
CPC ............. *B60L 11/1803* (2013.01); *B60L 15/20* (2013.01); *B60L 2240/461* (2013.01); *B60L 2240/423* (2013.01); *Y02T 10/7005* (2013.01); *Y02T 10/70* (2013.01)
USPC ................... 701/22; 318/98; 318/99; 318/52; 318/434; 701/37; 701/38; 701/70; 701/71; 701/90; 701/99; 340/5.5

(58) Field of Classification Search
CPC . B60L 3/38; B60L 2240/486; B60L 11/1803; B60L 15/20; B60L 2240/461; B60L 2240/423; H02P 21/35; Y02T 10/642; Y02T 10/7005; Y02T 10/70; B60W 10/08
USPC .......... 701/22, 37, 38, 70, 71, 90, 99; 318/52, 318/98, 99, 434; 340/5.5
See application file for complete search history.

(56) References Cited

U.S. PATENT DOCUMENTS 3,955,410 A * 5/1976 Wakabayashi et al. .... 73/862.18
5,009,279 A * 4/1991 Matsuda ....................... 180/197
(Continued)

FOREIGN PATENT DOCUMENTS

DE 3817537 A1 12/1988
DE 102005049070 A1 4/2007
(Continued)

OTHER PUBLICATIONS

Extended European Search Report Dated Apr. 19, 2012, Application No. 11186098.7-2207, Applicant Volvo Car Corporation, 7 Pages.

*Primary Examiner* — Calvin Cheung
*Assistant Examiner* — Allen E Quillen
(74) *Attorney, Agent, or Firm* — Brooks Kushman P.C.

(57) ABSTRACT

A motor assembly comprises an electric power train that is adapted to be connected to a power source and is also adapted to impart a torque to a wheel when the motor assembly is operating. The assembly further comprises a power determination means adapted to determine the amount of power supplied from the power source to the electric power train when the motor assembly is operating. In addition, the assembly comprises a rotational speed determination means adapted to determine a rotational speed of the wheel when the motor assembly is operating. Moreover, the assembly comprises a torque determination means adapted to determine a command torque value indicative of a requested torque to the wheel.

16 Claims, 3 Drawing Sheets

(56) References Cited

U.S. PATENT DOCUMENTS

| | | | |
|---|---|---|---|
| 5,148,883 A * | 9/1992 | Tanaka et al. | 180/165 |
| 5,164,903 A * | 11/1992 | Lin et al. | 701/89 |
| 5,453,930 A * | 9/1995 | Imaseki et al. | 701/22 |
| 5,465,806 A * | 11/1995 | Higasa et al. | 180/165 |
| 5,731,669 A * | 3/1998 | Shimizu et al. | 318/139 |
| 5,795,262 A * | 8/1998 | Robinson | 477/92 |
| 5,796,224 A * | 8/1998 | Hayashi et al. | 318/139 |
| 5,801,498 A * | 9/1998 | Kusano et al. | 318/139 |
| 5,804,973 A * | 9/1998 | Shinohara et al. | 324/548 |
| 5,808,428 A * | 9/1998 | Ito et al. | 318/139 |
| 5,939,846 A * | 8/1999 | Young et al. | 318/98 |
| 6,154,702 A * | 11/2000 | Fodor et al. | 701/71 |
| 6,422,333 B1 * | 7/2002 | Kjær et al. | 180/197 |
| 6,629,453 B1 * | 10/2003 | Surnilla et al. | 73/114.73 |
| 6,662,096 B2 * | 12/2003 | Komiyama et al. | 701/54 |
| 6,864,646 B2 * | 3/2005 | Rahman et al. | 318/41 |
| 6,909,959 B2 * | 6/2005 | Hallowell | 701/88 |
| 7,287,443 B2 * | 10/2007 | Kuhstrebe et al. | 74/335 |
| 7,403,850 B1 * | 7/2008 | Boutin et al. | 701/107 |
| 7,587,268 B2 * | 9/2009 | Tagami et al. | 701/102 |
| 7,729,842 B2 * | 6/2010 | Sugita | 701/84 |
| 7,860,630 B2 * | 12/2010 | Pognant-Gros et al. | 701/51 |
| 7,922,616 B2 * | 4/2011 | Manken et al. | 477/3 |
| 8,255,104 B2 * | 8/2012 | Terayama | 701/22 |
| 8,311,718 B2 * | 11/2012 | Jess et al. | 701/71 |
| 8,370,013 B2 * | 2/2013 | Linda et al. | 701/22 |
| 8,428,840 B2 * | 4/2013 | O'Dea et al. | 701/71 |
| 8,442,737 B2 * | 5/2013 | Seurer et al. | 701/74 |
| 8,449,049 B2 * | 5/2013 | Bourqui et al. | 303/151 |
| 8,478,503 B2 * | 7/2013 | Otsuka | 701/99 |
| 2004/0065488 A1 * | 4/2004 | Hightower | 180/65.1 |
| 2010/0194316 A1 * | 8/2010 | Eisenhardt | 318/400.02 |
| 2011/0010031 A1 * | 1/2011 | Syed et al. | 701/22 |
| 2011/0246020 A1 * | 10/2011 | Munnix | 701/34 |
| 2011/0264345 A1 * | 10/2011 | Heim et al. | 701/70 |
| 2011/0295457 A1 * | 12/2011 | Linda et al. | 701/29 |
| 2012/0053010 A1 * | 3/2012 | Kuang et al. | 477/3 |
| 2012/0143425 A1 * | 6/2012 | Yamamoto et al. | 701/22 |
| 2012/0203416 A1 * | 8/2012 | Yoshimura | 701/22 |

FOREIGN PATENT DOCUMENTS

| | | |
|---|---|---|
| EP | 0579513 A1 | 1/1994 |
| JP | 2008092708 A | 4/2008 |

* cited by examiner

MOTOR ASSEMBLY

CROSS-REFERENCE TO RELATED APPLICATIONS

This application claims foreign priority benefits under 35 U.S.C. §119(a)-(d) to European patent application number EP 11186098.7, filed Oct. 21, 2011, which is incorporated by reference in its entirety.

TECHNICAL FIELD

The present disclosure relates to a motor assembly. Moreover, the present disclosure relates to a vehicle comprising a motor assembly and a method for operating an electric power train.

BACKGROUND

Electric power trains may be used in a plurality of different systems. Purely by way of example, a vehicle may be propelled by an electric power train.

In order to obtain a requested amount of power, e.g., in terms of the torque delivered to one or more wheels, a power train is generally controlled such that the torque delivered corresponds to, or at least relates to, a requested torque.

However, in the event of any malfunction of inter alia the electric power train or the control thereof, there is a risk that there may be a discrepancy between the torque delivered from the electric power train and the requested torque.

If an electric power train is adapted to propel a vehicle, the above torque discrepancy may result in a sudden acceleration or a sudden deceleration of the vehicle. Such a sudden acceleration or deceleration may in turn result in undesired traffic situations.

In an attempt to reduce the risk of obtaining a torque discrepancy in an electric power train, EP 0 579 513 proposes a torque control system for controlling the torque of an AC motor. The '513 control system includes a voltmeter, an ammeter and a rotational speed sensor for measuring the rotational speed of the AC motor. Even though the '513 control system may detect some conditions when there is a torque discrepancy, the '513 control system may not be suitable for detecting discrepancies that are occasioned by e.g., defects in the AC motor or the control system per se.

SUMMARY

One object of the disclosure is to reduce or ameliorate at least one of the disadvantages of the prior art systems and/or methods, or to provide a useful alternative.

As such, the present disclosure relates to a motor assembly comprising an electric power train. The electric power train is adapted to be connected to a power source, such as a battery, and is also adapted to impart a torque to a wheel when the motor assembly is operating. The assembly comprises a power determination means adapted to determine the amount of power supplied from the power source to the electric power train when the motor assembly is operating. The assembly further comprises a rotational speed determination means adapted to determine a rotational speed of the wheel when the motor assembly is operating. Moreover, the assembly comprises a torque determination means adapted to determine a command torque value indicative of a requested torque to the wheel.

According to the present disclosure, the assembly comprises a torque verification means adapted to establish a fictive relation indicative of to what extent an actual torque to the wheel corresponds to the command torque value, the fictive relation comprising the following parameters: the supplied power, the rotational speed of the wheel and the command torque value.

The above motor assembly, that uses input outside the electric power train, implies that the torque to the wheel may be monitored in a straightforward and robust manner.

Optionally, the assembly comprises an electric power train control means adapted to receive the command torque value and to control the electric power train in order to obtain a torque of the wheel, which torque is related to the command torque value. The electric power train control means is separate from the torque verification means.

The feature that the electric power train control means is separate from the torque verification means implies that the torque verification means may be adapted to detect a torque discrepancy even if such a torque discrepancy is occasioned by a malfunction of the electric power train control means.

Optionally, the assembly comprises an electric power train control unit comprising the electric power train control means. The assembly further comprises a torque verification unit comprising the torque verification means. The electric power train control unit and the torque verification unit are separate units.

Optionally, the torque verification means is adapted to establish a quality measure indicative of to what extent the fictive relation is fulfilled.

Optionally, the torque verification means is adapted to modify the amount of power supplied from the power source, e.g., the battery, to the electric power train if the quality measure is outside of a predetermined preferred quality measure range. Preferably, the torque verification means is adapted to reduce the amount of power, or even cut the power, supplied from the power source to the electric power train if the quality measure is outside of a predetermined preferred quality measure range.

Optionally, the fictive relation is formulated such as to compare the command torque value with an actual torque value, the actual torque value being determined by using at least the following parameters: the supplied power and the rotational speed of the wheel.

Optionally, the assembly comprises an actuator adapted to emit the command torque value.

Optionally, the electric power train comprises an inverter and an electric motor, the inverter being adapted to be connected to the power source and the electric motor being adapted to be connected to the wheel.

A second aspect of the present disclosure relates to a vehicle comprising a motor assembly according to the first aspect of the present disclosure.

Optionally, the vehicle further comprises a power source and a wheel.

A third aspect of the present disclosure relates to a method for operating an electric power train. The electric power train is connected to a power source, e.g., a battery, and is adapted to impart a torque to a wheel. The method comprising:
  determining a command torque value indicative of a requested torque of the wheel;
  determining an amount of power supplied from the power source to the electric power train;
  determining a rotational speed of the wheel; and
  establishing a fictive relation indicative of to which extent an actual torque of the wheel corresponds to the command torque value, the fictive relation comprising the following parameters: the supplied power, the rotational speed of the wheel and the command torque value.

Optionally, the method further comprises:
controlling the electric power train in order to obtain a torque of the wheel which torque is related to the command torque value, the step of controlling the electric power train being separate from the step of determining the fictive relation.

Optionally, the method further comprises:
establishing a quality measure indicative of to what extent the fictive relation is fulfilled; and
modifying, preferably reducing, the amount of power supplied from the power source to the electric power train if the quality measure is outside of a predetermined preferred quality measure range.

BRIEF DESCRIPTION OF THE DRAWINGS

Embodiments of the present disclosure will hereinafter be described in greater detail by means of non-limiting examples and with reference to the attached drawings in which.

It should be noted that the appended drawings are not necessarily drawn to scale and that the dimensions of some features of the present disclosure may have been exaggerated for the sake of clarity.

DETAILED DESCRIPTION

As required, detailed embodiments according to the present disclosure are provided herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Example embodiments are set forth in the following description and in FIGS. 1-3. It is to be understood, however, that the embodiments are included in order to explain principles of the disclosure and not to limit the scope of the disclosure defined by the appended claims.

Figure 1:
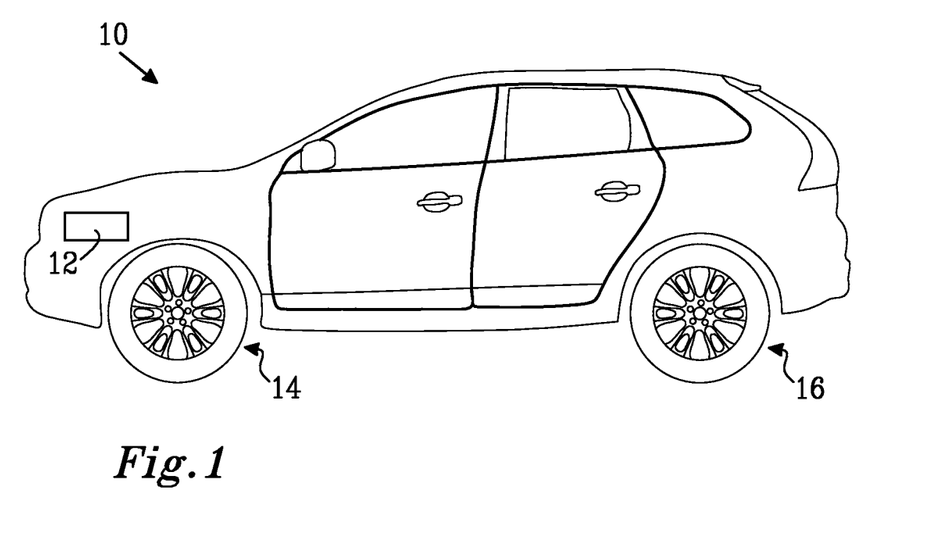
FIG. 1 illustrates a vehicle comprising a motor assembly according to the present disclosure.

FIG. 1 illustrates a vehicle 10 comprising a motor assembly 12. The FIG. 1 vehicle 10 is a car, but the vehicle 10 may in other implementations of the present disclosure be any other type of vehicle such as a truck, bus, lorry or the like.

The vehicle 10 comprises a plurality of wheels 14, 16, at least one of which is adapted to propel the vehicle. In implementations of the vehicle, at least two of the wheels, and in some implementations at least four wheels, are adapted to propel the vehicle.

Figure 2:
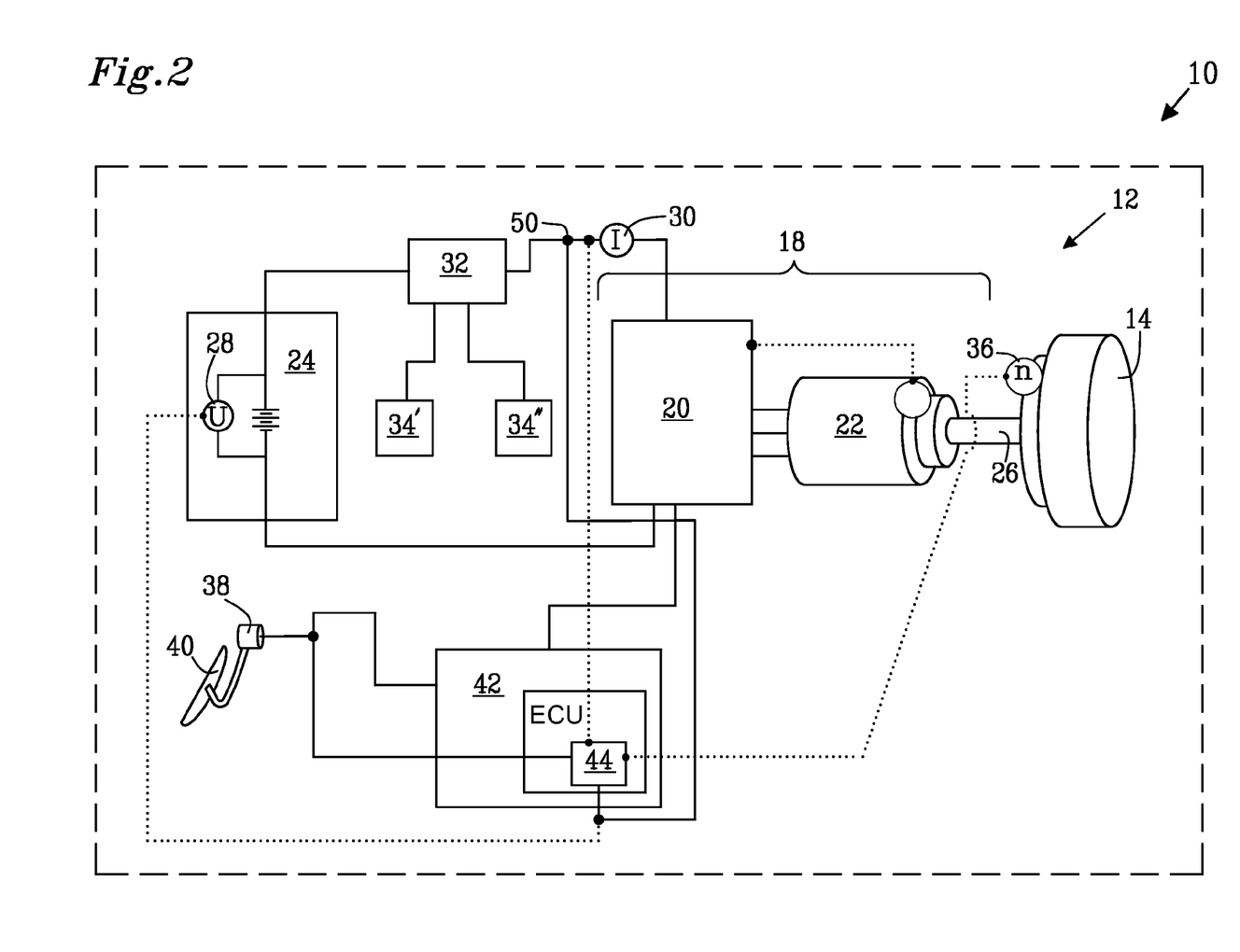
FIG. 2 illustrates a motor assembly according to an embodiment of the present disclosure.

FIG. 2 illustrates an embodiment of a motor assembly 12 according to the present disclosure. The FIG. 2 motor assembly 12 comprises an electric power train 18. The implementation of the electric power train 18 in FIG. 2 comprises an inverter 20 and an electric motor 22. The FIG. 2 embodiment of the motor assembly 12 may be used in a vehicle, such as the vehicle 10 illustrated in FIG. 1. However, the motor assembly 12 of the present disclosure may also be used in other systems than a vehicle.

The electric power train 18 is adapted to be connected to a power source 24 and is also adapted to impart a torque to a wheel 14 when the motor assembly 12 is operating. In the FIG. 2 implementation, the inverter 20 is adapted to be connected to the power source 24 and the electric motor 22 is adapted to be connected to the wheel 14.

In the FIG. 2 embodiment, the power source 24 is a battery. However, the power source may comprise any type of means that is adapted to store and/or produce electric power. Purely by way of example, the power source may comprise a fuel cell (not shown) or a generator (not shown).

In order to impart a torque to a wheel 14, the electric power train 18 and the wheel 14 are connected to one another such that a torque may be transmitted from the electric power train 18 to the wheel 14. Purely by way of example, the electric power train 18 and the wheel 14 may be mechanically and/or hydraulically connected to one another. Moreover, the electric power train 18 and the wheel 14 may be connected to one another via one or more transmission arrangements (not shown in FIG. 2), such as a gear box (not shown) or the like. In the FIG. 2 implementation of a vehicle, the electric motor 22 is mechanically connected to the wheel 14 via a torque transmitting shaft 26.

FIG. 2 further illustrates that the motor assembly 12 comprises power determination means 28, 30 adapted to determine the amount of power supplied from the power source 24 to the electric power train 18 when the motor assembly 12 is operating. While the power determination means 28, 30 may include any suitable device such as one or more sensors and/or one or more controllers, in the embodiment illustrated in FIG. 2, the power determination means 28, 30 comprises a voltmeter 28 adapted to determine the voltage of the power source 24 and an ammeter 30 adapted to determine the current supplied from the power source 24 to the inverter 20.

In the FIG. 2 implementation, the vehicle 10 comprises a power distribution unit 32 adapted to distribute electrical power from the power source 24 to various power consuming units 34', 34" of the vehicle 10. In the event that a vehicle comprises such a power distribution unit 32, the ammeter 30 is preferably adapted to measure the current supplied from the power distribution unit 32 to the electric power train 18.

The assembly 12 further comprises a rotational speed determination device or means 36, such as a sensor and/or controller, adapted to determine a rotational speed of the wheel 14 when the motor assembly 12 is operating.

Moreover, the assembly 12 comprises a torque determination device or means 38, such as a sensor and/or controller, adapted to determine a command torque value $M_{com}$ indicative of a requested torque to the wheel 14.

The torque determination means 38 may be, directly or indirectly, in communication with a torque request means 40. In the FIG. 2 embodiment of the motor assembly 12, the torque request means 40 is an actuator that is adapted to be manually actuated and the torque request means 40 is in FIG. 2 exemplified by an accelerator pedal. However, in other embodiments of the motor assembly 12, the torque request means 40 may be automatically actuated, for instance if the motor assembly 12 is connected to a cruise control function and/or is adapted to be controlled in response to the driving characteristics of a target vehicle or object. Furthermore, the torque request means 40 could comprise a brake pedal (not shown).

In further embodiments of the motor assembly 12, the torque request means 40 may be adapted to receive instructions indicative of a requested torque, which instructions are transmitted from a transmitter (not shown in FIG. 2) that may be located in, on or outside of the vehicle 10 hosting the motor assembly 12. In the latter example, the torque request means 40 may comprise means for receiving such instruction. Purely by way of example, the torque request means 40 may in such a case comprise means (not shown) for receiving torque requests signals that are transmitted wirelessly, for instance via a carrier wave.

Moreover, it should be noted that in embodiments of the motor assembly 12, the torque determination means 38 and the torque request means 40 may form a single component.

FIG. 2 further illustrates that the motor assembly 12 comprises an electric power train control means, or controller, 42. The electric power train control means 42 is adapted to be in communication with the torque determination means 38 as well as at least one portion of the electric power train 18. In FIG. 2, the electric power train control means 42 is adapted to be in communication with the inverter 20 of the electric power train 18.

Based on the command torque value $M_{com}$ determined by the determination means 38, the electric power train control means 42 is adapted to control the electric power train 18 to impart a torque to the wheel 14, which torque is equal to, or at least correlates to, the command torque value $M_{com}$.

In the FIG. 2 embodiment, the electric power train control means 42 controls the inverter 20 such that an appropriate amount of power is supplied from the power source 24 to the inverter 20.

Moreover, FIG. 2 illustrates that the motor assembly 12 comprises a torque verification means 44, or torque controller, adapted to determine to what extent an actual torque to the wheel 14 corresponds to the command torque value $M_{com}$. In the FIG. 2 embodiment, the torque verification means 44 is located within the electric power train control means 42. Purely by way of example, the electric power train control means 42 may comprise an electronic control unit ECU, which unit comprises control functions. The torque verification means 44 may in such a case be implemented as one or more functions or methods within the ECU.

The torque verification means 44 is preferably separate from the electric power train control means 42. In the above embodiment, this separation may be achieved by separating the one or more functions of the torque verification means 44 from functions of the electric power train control means 42 such that functions for the above two means are prevented from interaction.

Figure 3:
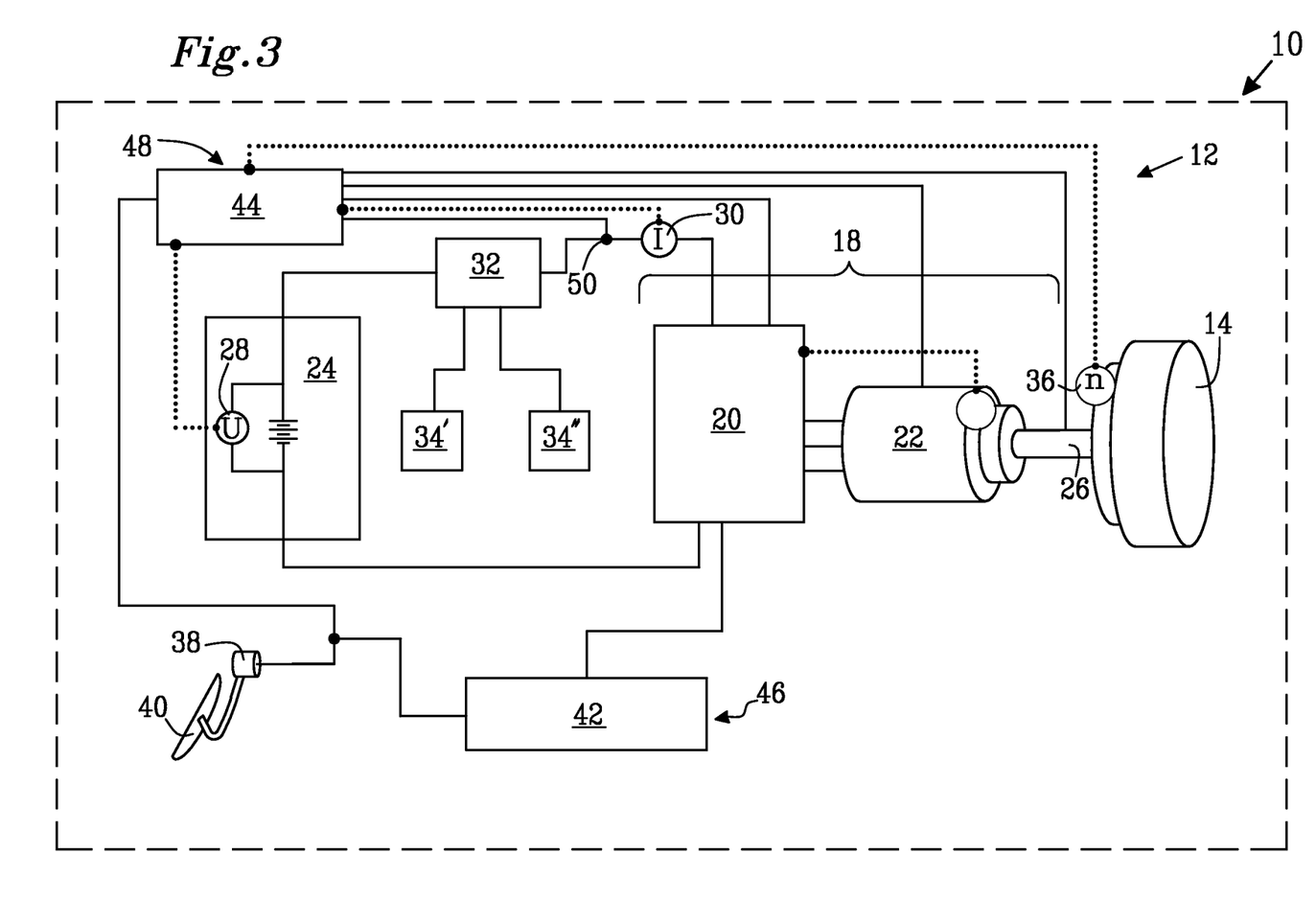
FIG. 3 illustrates a motor assembly according to another embodiment of the present disclosure.

However, FIG. 3 illustrates another embodiment of the motor assembly 12 comprising an electric power train control unit 46 comprising the electric power train control means 42. The assembly 12 further comprises a torque verification unit 48 comprising the torque verification means 44. The electric power train control unit 46 and the torque verification unit 48 are separate units. As used herein, the expression "separate units" is intended to mean that the electric power train control unit 46 and the torque verification unit 48 are prevented from direct communication with one another. As such, the motor assembly 12 of the present disclosure preferably does not include any cables or other communication means directly connecting the electric power train control unit 46 to the torque verification unit 48.

Preferred methods of operating any one of the above embodiments of the electric power train 12 are presented hereinbelow. In the below presentation, the FIG. 2 embodiment of the electric power train 12 is used as an example. However, the below presentation would be equally applicable for at least any one of the above discussed embodiments and implementations of the power train 12 of the present disclosure.

When the electric power train 12 is in an operating condition, a command torque value $M_{com}$ is determined using the torque determination means 38. Moreover, the power determination means 28, 30 determines the amount of power $P_{power\_train}$, for instance by determining the voltage and current, supplied from the power source 24 to the electric power train 18. Moreover, the rotational speed determination means 36 determines a rotational speed $n_{wheel}$ of the wheel 14.

The power $P_{wheel}$ to the wheel 14 is equal to the actual torque to the wheel $M_{act}$ multiplied by the rotational speed $n_{wheel}$ of the wheel 14. Moreover, assuming that a specific factor of power losses η occurs in the electric power train 18, the power $P_{wheel}$ to the wheel 14 should be equal to the power $P_{power\_train}$ supplied to the electric power train 18 multiplied by the specific factor of power losses η. If it assumed that no power losses occur in the electric power train 18, the specific factor of power losses η is set to one. The above power equality results in the following equation:

$$M_{act} = \frac{\eta \cdot P_{power\_train}}{n_{wheel}}. \quad \text{(Eq. 1)}$$

If the actual torque to the wheel $M_{act}$ is not similar to the command torque value $M_{com}$, this may be an indication that the electric power train 12 does not operate in an appropriate manner.

As such, when operating the electric power train 12, a fictive relation indicative of to what extent an actual torque $M_{act}$ to the wheel 14 corresponds to the command torque value $M_{com}$ is preferably established. Purely by way of example, a fictive relation may be established that compares the torque difference ΔM between the actual torque $M_{act}$ and the command torque value $M_{com}$ in accordance with the following relation:

$$\Delta M = M_{act} - M_{com}. \quad \text{(Eq. 2)}$$

As another example, a fictive relation may be established for the power supplied to the wheel according to the following:

$$\Delta P = \eta \cdot P_{power\_train} - M_{com} \cdot n_{wheel}. \quad \text{(Eq. 3)}$$

As may be gleaned from Eq. 2 and Eq. 3 hereinabove, each one of the fictive relations comprises the parameters: the supplied power $P_{power\_train}$, the rotational speed of the wheel $n_{wheel}$ and the command torque value $M_{com}$. The torque verification means 44 is preferably adapted to establish at least one fictive relation comprising the above parameters and preferably at least one of the relations indicated in Eq. 2 or Eq. 3 hereinabove.

In the example hereinbelow, a fictive relation established in accordance with Eq. 2 will be used as an example. However, is should be noted that the below example would be equally valid, should the fictive relation according to Eq. 3 (or any other type of fictive relation comprising the parameters $P_{power\_train}$, $n_{wheel}$ and $M_{com}$) be used instead.

In Eq. 2, the torque difference ΔM may be regarded as a quality measure indicative of to what extent the fictive relation is fulfilled. As such, if the torque difference ΔM equals zero, the fictive relation is fully fulfilled. On the other hand, if the torque difference ΔM is less than zero, the actual torque $M_{act}$ to the wheel is lower than the command torque value $M_{com}$. Finally, if the torque difference ΔM is greater than zero, the actual torque $M_{act}$ to the wheel is greater than the command torque value $M_{com}$.

Of the above three torque difference ΔM scenarios, the last scenario (indicating a torque difference ΔM greater than zero)

may often be regarded as the least preferred. This is since the last scenario implies that the actual torque $M_{act}$ to the wheel 14 exceeds the torque that is actually requested. Such an actual torque $M_{act}$ excess may in turn imply that the vehicle 10 hosting the motor assembly 12 will be subjected to an undesired increase in speed and/or acceleration, such as a sudden acceleration. Such an increase in speed and/or acceleration may be undesired from a traffic safety point of view.

However, it should be noted that the second scenario (indicating a torque difference ΔM smaller than zero) is also generally undesired. A torque difference ΔM smaller than zero may be indicative of a power loss in the motor assembly 12, in particular a power loss in the electric power train 18, and/or of the fact that a braking moment is unintentionally obtained from the motor assembly 12. As such, in the second scenario, an undesired braking and/or deceleration of the vehicle 10 may be obtained which in turn may result in an undesired traffic situation.

The above discussed differences between the actual torque $M_{act}$ and the command torque value $M_{com}$, be it an actual torque $M_{act}$ excess or deficit in relation to the command torque value $M_{com}$, may be occasioned by the malfunction of one or more components of the motor assembly 12. Purely by way of example, the difference between the actual torque $M_{act}$ and the command torque value $M_{com}$ may be occasioned by a malfunction of at least one of the inverter 20, the motor 22, the power supply 24 and the electric power train control means 42. The fact that the torque discrepancy may be occasioned by a malfunction of the electric power train control means 42 is one of the reasons for why it is generally preferred to separate the torque verification means 44 from the electric power train control means 42.

The torque verification means 44 further comprises a predetermined preferred quality measure range QMR and the torque verification means 44 may preferably be adapted to modify the amount of power supplied from the power source 24 to the electric power train 18 if the quality measure ΔM is outside of the predetermined preferred quality measure range QMR. Preferably, the torque verification means 44 may be adapted to reduce the amount of power, more preferred cut the power, supplied from the power source 24 to the electric power train 18 if the quality measure ΔM is outside of a predetermined preferred quality measure range QMR.

In scenarios where the actual torque $M_{act}$ is lower than the command torque value $M_{com}$, the torque verification means 44 may be adapted to increase the amount of power supplied from the power source 24 to the electric power train 18.

As a further example, a scenario in which the actual torque $M_{act}$ is lower than the command torque value $M_{com}$ may be occasioned by the fact that one or more bearings (not shown) of the wheel 14 and/or the torque transmitting shaft 26 are operating in an undesired manner, the bearings may for instance produce undesired friction losses. As such, instead of, or in addition to, increasing the amount of power supplied from the power source 24 to the electric power train 18, the torque verification means 44 may also be adapted to communicate a signal to the driver and/or operator of the motor assembly 12 which signal is indicative of that one or more components of the motor assembly 12 operates in an undesired manner.

Furthermore, a vehicle 10 hosting a motor assembly 12 comprising an electric power train 18 may preferably be adapted so as to use at least a portion of the electric power train 18, preferably the electric motor 22 of the electric power train 18, as a generator for generating power to the power source 24 when the vehicle 10 is braking. As such, the wheel 14 is in such a braking situation adapted to drive the portion of the electric power train 18 acting as a generator and the wheel 14 is consequently imparted a torque that will brake the vehicle 10.

However, there is a risk that the power generating function of the motor assembly may malfunction which in turn may result in that the wheel 14 may be heavily braked, the wheel 14 may in such a situation even be locked from rotation, and this in turn may result in an undesired traffic situation. As such, if the torque verification means 44 determines that an actual braking torque $M_{act}$ is substantially larger than a command braking torque value $M_{com}$, the torque verification means 44 may be adapted to issue a signal that the wheel 14 should be disconnected from the electric power train 18. For instance, the torque verification means 44 may be adapted to issue a signal that the torque transmitting shaft 26 should be disconnected from the electric motor 22 and/or issue a signal that the actual braking torque $M_{act}$ in the motor 22 should be reduced, preferably reduced to almost zero.

The torque verification means 44 may preferably be connected to a power control device or means 50, such as a switch, that is connected to the power source 24, the electric power train 18 or any power distributing means (such as cables) connecting the power source 24 and the electric power train 18. However, the torque verification means 44 may also and/or instead be connected to a portion of the power train 18 for instance. Purely by way of example, the torque verification means 44 may be connected to at least one of the inverter 20, the electric motor 22 and the torque transmitting shaft 26. FIG. 3 illustrates an implementation of the torque verification means 44 wherein the means 44 is connected to each one of the three components 20, 22, 26 of the motor assembly 12. However, in other implementations, the torque verification means 44 may be connected to only one or two of the above three components.

As has been intimated hereinabove, a power situation wherein the actual torque $M_{act}$ to the wheel 14 exceeds the command torque value $M_{com}$ may often be regarded as a more adverse situation as compared to a situation wherein the actual torque $M_{act}$ is lower than the command torque value $M_{com}$. As such, the preferred quality measure range QMR may preferably have an asymmetrical distribution around the value zero (wherein a zero value is indicative of an equality between the actual torque value $M_{act}$ and the command torque value $M_{com}$).

Purely by way of example, the preferred quality measure range QMR may comprise a range from −5% to +1% of the absolute value of the command torque value $M_{com}$, more preferred −4% to 0% of the absolute value of the command torque value $M_{com}$.

Instead of, or in addition, to the above discussed quality measure range QMR, an implementation of the torque verification means 44 may be adapted to determine the sign of the command torque value $M_{com}$ (i.e. positive or negative) and the sign of the actual torque $M_{act}$. In such an embodiment, the torque verification means 44 may further be adapted to reduce the amount of power, preferably cut the power, supplied from the power source 24 to the electric power train 18 whenever a mismatch between the signs of the command torque value $M_{com}$ and the actual torque $M_{act}$ is determined.

Furthermore, in other embodiments of the motor assembly 12, it may also be desirable to avoid situations wherein the actual torque $M_{act}$ is lower than the command torque value $M_{com}$ such that inadvertent braking and/or deceleration of the vehicle 10 is at least reduced. For such an embodiment, the range QMR may preferably have a symmetrical distribution around the value zero. Optionally, a quality measure according to the following may be used:

$$\Delta M = |M_{act} - M_{com}|. \quad (Eq. 4)$$

With a quality measure according to Eq. 4, the preferred quality measure range QMR may comprise a range from 0 to 5%, preferably from 0 to 3%, of the command torque value $M_{com}$.

While there have been shown and described and pointed out fundamental novel features of the disclosure as applied to a preferred embodiment thereof, it will be understood that various omissions and substitutions and changes in the form and details of the devices illustrated, and in their operation, may be made by those skilled in the art.

For example, it is expressly intended that all combinations of those elements and/or method steps which perform substantially the same function in substantially the same way to achieve the same results are within the scope of the disclosure.

Moreover, it should be recognized that structures and/or elements and/or method steps shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

Furthermore, in accordance with the embodiments described herein, the means (e.g., means 28, 30, 36, 38, 40, 42, 44, 50, etc.) for performing the various functions described above may each comprise or further comprise one or more of the following: computer software, hardware or both, such as an Application Specific Integrated Circuit (ASIC), one or more appropriately programmed microprocessors, one or more controllers or control modules, and/or one or more suitable sensors.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A motor assembly comprising:
an electric power train adapted to be connected to a power source and also adapted to impart a torque to a wheel when the motor assembly is operating;
a power determination means adapted to determine the amount of power supplied from the power source to the electric power train $P_{power\_train}$ when the motor assembly is operating;
a rotational speed determination means adapted to determine a rotational speed of the wheel $n_{wheel}$ when the motor assembly is operating;
a torque determination means adapted to determine a command torque value $M_{com}$ indicative of a requested torque to the wheel; and
a torque verification means adapted to establish a relation indicative of to what extent an actual torque $M_{act}$ to the wheel corresponds to the command torque value, the relation comprising the following parameters: the supplied power, the rotational speed of the wheel and the command torque value, wherein the relation is based on equation (1) $\Delta M = M_{act} - M_{com}$ or equation (2) $\Delta P = \eta \cdot P_{power\_train} - M_{com} \cdot n_{wheel}$, and wherein $\Delta M$ is torque difference, $M_{act} = \eta \cdot P_{power\_train}/n_{wheel}$, $\Delta P$ is power difference, and $\eta$ is a specific factor of power losses.

2. The motor assembly according to claim 1 further comprising an electric power train control means adapted to receive the command torque value and to control the electric power train in order to obtain a torque of the wheel, which torque is related to the command torque value, the electric power train control means being separate from the torque verification means.

3. The motor assembly according to claim 2 further comprising an electric power train control unit comprising the electric power train control means, and a torque verification unit comprising the torque verification means, the electric power train control unit and the torque verification unit being separate units.

4. The motor assembly according to claim 1 wherein the torque verification means is adapted to establish a quality measure indicative of to what extent the relation is fulfilled.

5. The motor assembly according to claim 4 wherein the torque verification means is adapted to modify the amount of power supplied from the power source to the electric power train if the quality measure is outside of a predetermined preferred quality measure range.

6. The motor assembly according to claim 1 further comprising an actuator adapted to emit the command torque value.

7. The motor assembly according to claim 1 wherein the electric power train comprises an inverter and an electric motor, the inverter being adapted to be connected to the power source and the electric motor being adapted to be connected to the wheel.

8. A method for operating an electric power train, the electric power train being connected to a power source and being adapted to impart a torque to a wheel, the method comprising:
determining, by a motor assembly, a command torque value $M_{com}$ indicative of a requested torque of the wheel;
determining, by the motor assembly, an amount of power supplied from the power source to the electric power train $P_{power\_train}$;
determining, by the motor assembly, a rotational speed of the wheel $n_{wheel}$;
establishing, by the motor assembly, a relation indicative of to which extent an actual torque $M_{act}$ of the wheel corresponds to the command torque value, the relation comprising the following parameters: the supplied power, the rotational speed of the wheel and the command torque value, wherein the relation is based on equation (1) $\Delta M = M_{act} - M_{com}$ or equation (2) $\Delta P = \eta \cdot P_{power\_train} - M_{com} \cdot n_{wheel}$ and wherein $\Delta M$ is torque difference, $M_{act} = \eta \cdot P_{power\_train}/n_{wheel}$, $\Delta P$ is power difference, and $\eta$ is a specific factor of power losses; and
controlling, by the motor assembly, the electric power training in order to impart a torque to the wheel, which torque is related to the command torque value, wherein the step of controlling the electric power train is separate from the step of establishing the relation.

9. The method according to claim 8 further comprising:
establishing, by the motor assembly, a quality measure indicative of to what extent the relation is fulfilled; and
modifying, by the motor assembly, the amount of power supplied from the power source to the electric power train if the quality measure is outside of a predetermined preferred quality measure range.

10. A motor assembly for use with a vehicle having a power source and a wheel, the motor assembly comprising:

an electric power train adapted to be connected to the power source and also adapted to impart a torque to the wheel;

a power determination device adapted to determine an amount of power supplied from the power source to the electric power train $P_{power\_train}$;

a rotational speed determination device adapted to determine a rotational speed of the wheel $n_{wheel}$;

a torque determination device adapted to determine a command torque value $M_{com}$ indicative of a requested torque to the wheel; and a torque verification controller adapted to establish a relation indicative of to what extent an actual torque $M_{act}$ to the wheel corresponds to the command torque value, the relation being based on the supplied power, the rotational speed of the wheel and the command torque value, wherein the relation is based on equation (1) $\Delta M = M_{act} - M_{com}$ or equation (2) $\Delta P = \eta \cdot P_{power\_train} - M_{com} \cdot n_{wheel}$, and wherein $\Delta M$ is torque difference, $M_{act} = \eta \cdot P_{power\_train}/n_{wheel}$, $\Delta P$ is power difference, and $\eta$ is a specific factor of power losses.

11. The motor assembly of claim 1 wherein the torque verification means is adapted to establish the relation based on equation (1).

12. The motor assembly of claim 1 wherein the torque verification means is adapted to establish the relation based on equation (2).

13. The method of claim 8 wherein establishing the relation is performed such that the relation is based equation (1).

14. The method of claim 8 wherein establishing the relation is performed such that the relation is based on equation (2).

15. The motor assembly of claim 10 wherein the torque verification controller is adapted to establish the relation based on equation (1).

16. The motor assembly of claim 10 wherein the torque verification controller is adapted to establish the relation based on equation (2).

* * * * *

UNITED STATES PATENT AND TRADEMARK OFFICE
CERTIFICATE OF CORRECTION

| | | |
|---|---|---|
| PATENT NO. | : 8,954,214 B2 | Page 1 of 1 |
| APPLICATION NO. | : 13/648718 | |
| DATED | : February 10, 2015 | |
| INVENTOR(S) | : Hans Pehrson et al. | |

It is certified that error appears in the above-identified patent and that said Letters Patent is hereby corrected as shown below:

In the Claims

Column 10, Line 55, Claim 8:

Before "in order"
Delete "training" and
Insert -- train --.

Signed and Sealed this
Twenty-third Day of June, 2015

Michelle K. Lee
*Director of the United States Patent and Trademark Office*